United States Patent [19]

Christensen

[11] Patent Number: 5,137,320
[45] Date of Patent: Aug. 11, 1992

[54] LADDER UTILITY RACK AND MOUNTING RAIL

[76] Inventor: David Christensen, 11 Moores Rd., Pennington, N.J. 08534

[21] Appl. No.: 762,575

[22] Filed: Sep. 19, 1991

[51] Int. Cl.⁵ .............................................. B60B 3/00
[52] U.S. Cl. ..................................... 296/3; 224/42.42
[58] Field of Search ......................... 296/3; 224/42.42

[56] References Cited

U.S. PATENT DOCUMENTS

| | | | |
|---|---|---|---|
| 2,134,823 | 11/1938 | Herrmann et al. | 248/361 |
| 3,877,624 | 4/1975 | Carson | 224/42.42 |
| 4,065,041 | 12/1977 | Shegavig et al. | 296/3 |
| 4,390,117 | 6/1983 | Fagan | 224/310 |
| 4,444,427 | 4/1984 | Martin | 296/43 |
| 4,984,837 | 1/1991 | Dise | 296/3 |
| 5,002,324 | 3/1991 | Griffen | 296/3 |

Primary Examiner—Robert R. Song
Attorney, Agent, or Firm—Kenneth P. Glynn

[57] ABSTRACT

The present invention is a ladder utility rack for pick-up truck cargo beds. It has two parallel horizontal base rails and at least two vertical stanchion units. Each base rail has horizontal and vertical running surfaces and each is adapted to nest atop and against sidewalls of a cargo bed. These base rails are not connected to one another except via the stanchion units. These units have vertical legs running from each of the base rails upwardly and inwardly and terminate at a commonly connected horizontal cross member. A second embodiment includes an additional set of rails, i.e. mounting rails, which run parallel to the base rails and, together with the base rails, form a horizontal platform for mounting items thereon to be transportable.

16 Claims, 3 Drawing Sheets

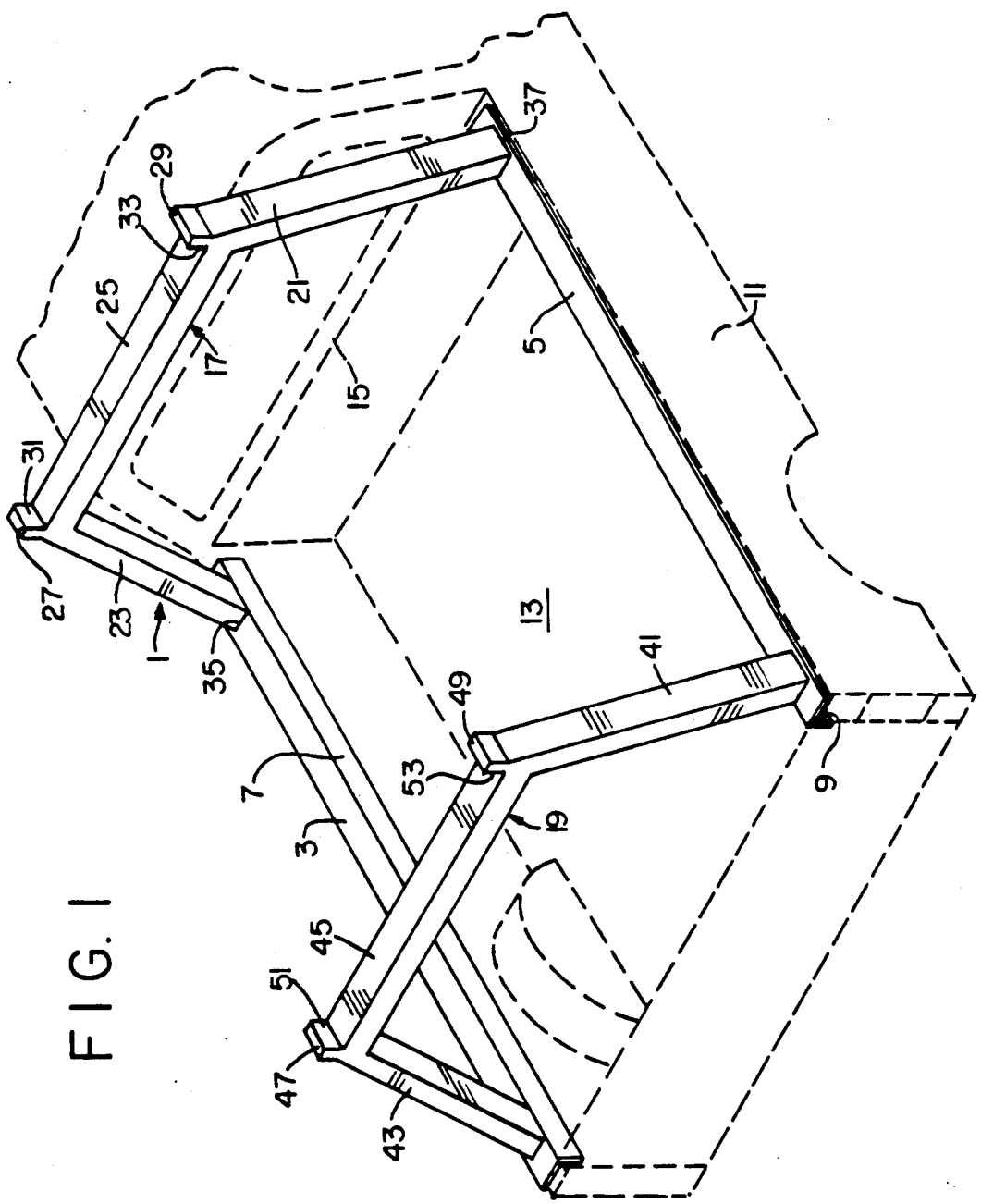

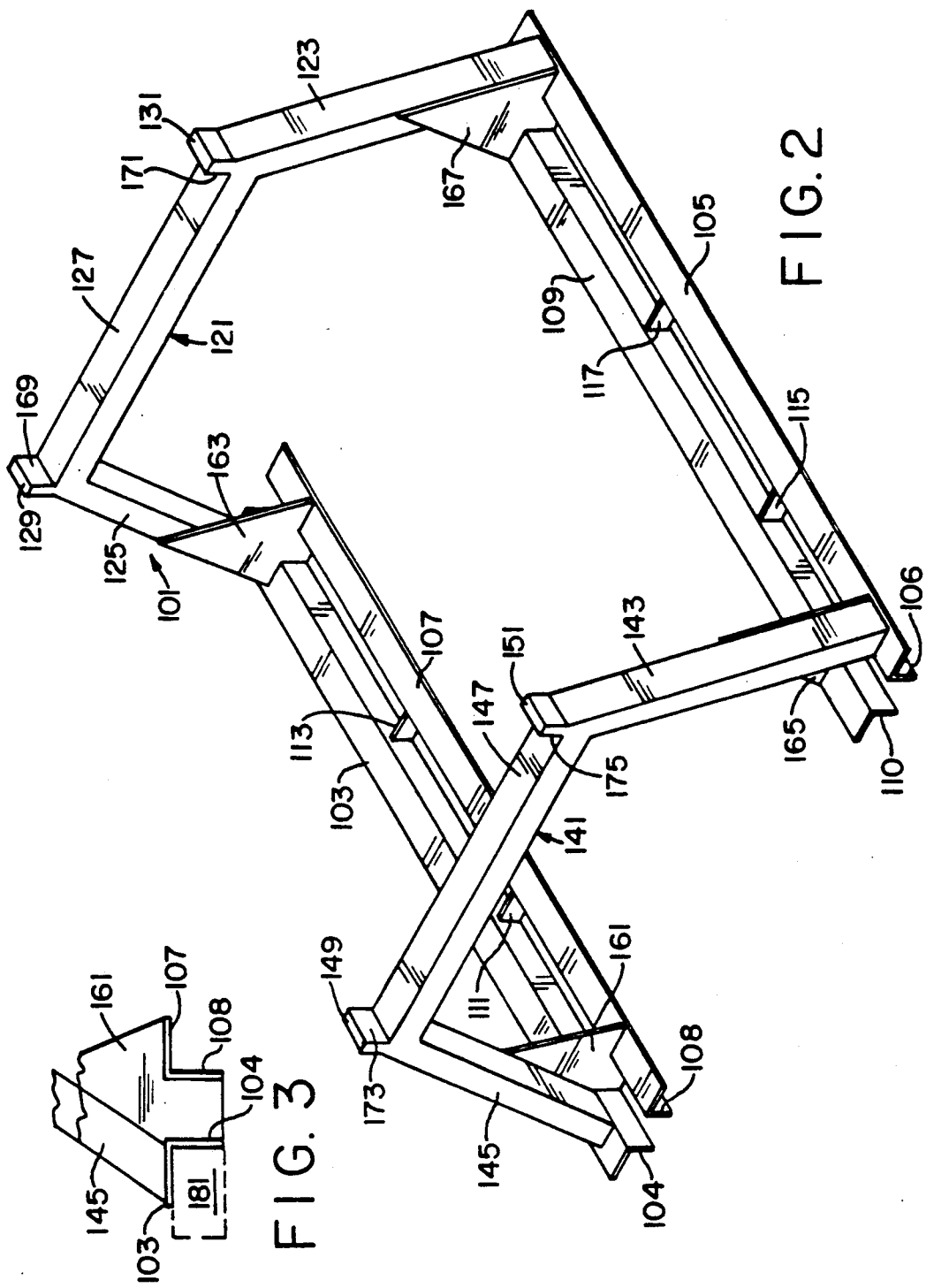

LADDER UTILITY RACK AND MOUNTING RAIL

BACKGROUND OF THE INVENTION

1. Field of the Invention

This invention relates to utility racks for pick-up truck cargo beds and particularly such utility racks for carrying ladders and other items of substantial length which may typically exceed the length of a cargo bed. The invention also relates to such utility racks as may include optional rails to create platforms for mounting items to be transported, e.g. tool boxes, storage bins, adapter plate mounted machinery, generators, compressors, and the like.

2. Prior Art Statement

With the development of cargo bed trucks came racks to support items for transportframes for carrying lumber, glass, ladders, etc. They were initially made of wood and took on a box-like open frame configuration. Subsequently, metal racks were developed to increase both strength and longevity. While the development of ladder utility racks and other racks did not stand still, most improvements pertained to "enhancing" the basic open box-like framing by adding to it rather than changing the framing configuration itself.

U.S. Pat. No. 2,134,823 describes a 1938 ladder rack which is side mounted and includes a complex clamping lever. U.S. Pat. No. 3,877,624 describes a ladder rack involving a plurality of bows which transverse the top of a closed truck, wherein one of the bows has clamps to clamp ladders. The bows are independently attached to the vehicle and are not connected in any fashion. Further, they appear not to be adaptable to cargo beds for carrying items having lengths greater than the cargo bed.

U.S. Pat. No. 4,390,117 describes a ladder rack for vehicles involving parallel side members and transverse cross members. It is adapted for mounting on the roof of a vehicle and, again, would not be effective for a pick-up bed. Also, complex rack attachment and ladder attachment mechanisms are included.

U.S. Pat. No. 4,444,427 teaches an auxiliary structured element for pick-up cargo beds which includes a four sided frame and subsequent cross members for mounting a deck, e.g. a top with an access door.

U.S. Pat. No. 4,984,837 is directed to a load support assembly for pick-up trucks. This device has vertical mounting supports and a tiltable load support cross member. It is used for transporting items in the cargo bed tilted upwardly and forwardly; it is cab mounted and cannot carry lengthy items in a horizontal position.

Most recently issued U.S. Pat. No. 5,002,324 describes a utility rack for pick-up cargo beds. The rack has two inverted "U" type stanchions attached to a continuous rail that encompasses both sidewalls and the forward wall of the cargo bed, itself forming a "U" type configuration in the horizontal plane. The rear stanchion is movable and removable. This is different from the present invention in the extra weight and material required for the forward wall section of the continuous rail, whereas the present invention relies upon parallel rails not connected directly to one another. It is also more difficult to install since this prior art device has exact fixed width of separation of the rail due to the direct connection. It is also subject to loosening and wearing of the rear stanchion mounting parts and even subject to the possibility of accidental disassemblage of the rear stanchion. Finally, because of the need for close tolerances of the rear stanchion and its mounts, the precise separation of the rail at its rear portion is essential to enable a user to subsequently mount the rear stanchion. None of those shortcomings exist with the present invention device.

SUMMARY OF THE INVENTION

The present invention is a ladder utility rack for pick-up truck cargo beds. It has two parallel horizontal base rails and at least two vertical stanchion units. Each base rail has horizontal and vertical running surfaces and each is adapted to nest atop and against sidewalls of a cargo bed. These base rails are not connected to one another except via the stanchion units. These units have vertical legs running from each of the base rails upwardly and inwardly and terminate at a commonly connected horizontal cross member. A second embodiment includes an additional set of rails, i.e. mounting rails, which run parallel to the base rails and, together with the base rails, form a horizontal platform for mounting items thereon to be transportable.

BRIEF DESCRIPTION OF THE DRAWING

The present invention should be more fully understood when the specification herein is taken in conjunction with the drawings appended hereto, wherein;

FIG. 1 shows a top perspective view of a present invention utility rack;

FIG. 2 shows a top perspective view of an alternative present invention utility rack with additional mounting rails;

FIG. 3 illustrates a partial end cut view of one side of the FIG. 2 utility rack;

DETAILED DESCRIPTION OF THE INVENTION

Figure 4:
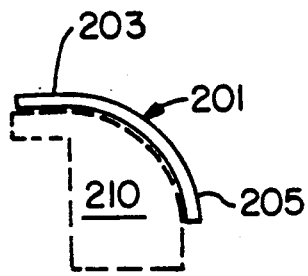
FIG. 4 shows a side view of an alternative base rail which may be used in a present invention utility rack.

The utility rack of the present invention has as one of its objectives to provide a rack which is durable and yet less complex than conventional racks. It is also an objective to provide a utility rack which has an inwardly biased horizontal cross section for receiving ladders and the like away from the outer periphery of the vehicle. It is also an objective to provide an easily installable rack which may be adapted for acting as a platform for mounting other items for transport, such as tools, tool boxes, storage bins, generators, pumps, gas motors, etc.

Referring now to FIG. 1 there is shown a top perspective view of a utility rack 1 mounted on cargo bed 13 of pick-up truck 11. A pair of base rails have horizontal surfaces 3 and 5 and vertical surfaces 7 and 9, respectively. The horizontal surfaces 3 and 5 nest atop the sidewalls of cargo bed 13 and the vertical surfaces 7 and 9 seat against the sidewalls, as shown. They may be bolted down, welded, or affixed by any known means.

Utility rack 1 includes stanchion units 17 and 19. Front stanchion unit 17 is attached to horizontal base rail surfaces 3 and 5 at the lower portions 35 and 37 of vertical legs 23 and 21, e.g. by welding, bolting, a combination of these, or other known means of attachment. The vertical legs 21 and 23 extend upwardly and inwardly and are mounted forwardly, as shown, and are connected by horizontal cross member 25. Lateral support blocks 27 and 29 are atop cross member 25 and, although optional, are preferred. These keep ladders, lumber, pipes, etc., from sliding or rolling off laterally at their inside surfaces 31 and 33. Also, due to the inward configuration of the vertical legs (e.g. 21 and 23) such items as ladders are transported away from the outer periphery of the pick-up truck. This becomes important when the truck is in motion and turning. The center of gravity is better maintained and there may be less tipping. This is safer and will cause less wear of shocks and springs. Also, note that the stanchions are not connected directly to one another but are connected by horizontal cross members, as shown.

Rear stanchion unit 19 has vertical legs 41 and 43 and these are similarly attached to the base rails as are legs 21 and 23. Also, they generally have the same cross sections, angles, sizes, etc., as the forward stanchion unit, and, although an exact replication is not critical, it is preferred.

FIG. 2 shows a top perspective view of alternative utility rack 101. Here, base rail running horizontal surface 103 and base rail running horizontal surface 105 nest atop opposite sidewalls of a cargo bed (not shown) and their vertical surfaces 104 and 106 fit against the sidewalls. Rear stanchion unit 141 includes vertical legs 143 and 145, attached to the base rail horizontal surfaces 105 and 103, as shown. They terminate upwardly and inwardly at cross member 147 and this embodiment includes optional lateral support blocks 149 and 151 with inside surfaces 173 and 175 to stop lateral shift of load off the rack.

Forwardly attached stanchion unit 121 likewise includes vertical legs 123 and 125, horizontal commonly connected cross member 127 and support blocks 129 and 131 with inside stop surfaces 169 and 171.

In this version, auxiliary sections are attached to provide for mounting platforms. Thus, mounting rails 107 and 109 are attached via spacers 111, 113 and 115, 117, as shown. These mounting rails 107 and 109 include vertical surfaces 108 and 110, respectively. They have a cross section which includes horizontal and vertical surfaces and are attached with the horizontal surfaces directed away from the base rails to which they are attached, as shown. In preferred embodiments such as is shown in FIG. 2, they have a mirror image cross section to the base rails and may be sectioned or full length. Optional support plates 161, 163, 165 and 167 have a triangle and base configuration and are inserted between vertical surfaces 104 and 108 and between 106 and 110, as shown, and are also attached to horizontal surfaces 103, 107 and 105, 109, as shown. Finally, they are connected to the vertical legs 143, 145, 123 and 125, as shown.

FIG. 3 shows an end view of a partial cut looking into the left end of rack 101. Bed wall 181 is shown with horizontal surface 103 on its top and vertical surface 104 on its side; these being connected by welding (or bolts, not shown), or other attachment means. Other parts identified with respect to FIG. 2 are like numbered.

FIG. 4 shows an end view of an alternative shape for a present invention rack base rail. Here, the base rail 201 is arcuated to fit tightly upon a curved cargo bed wall 210, but includes horizontal surface 203 and vertical surface 205.

Figure 5:
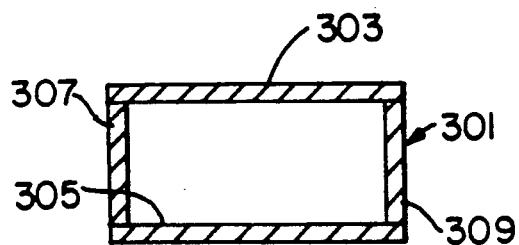
FIG. 5 shows a side cut view of a stanchion unit cross member.

FIG. 5 shows a side cut view of a stanchion unit cross member 301. It includes four sides, e.g. of metal plate, 303, 305, 307 and 309 to form a tubular structure. This could be welded, for example. Alternatively, two angle pieces, e.g. angle irons, could be attached, a "U" channel could be used alone, a plate and "U" channel could be attached, or a tubular extruded form could be used. This typifies the cross sections of the stanchion unit legs, as well.

Figure 6:
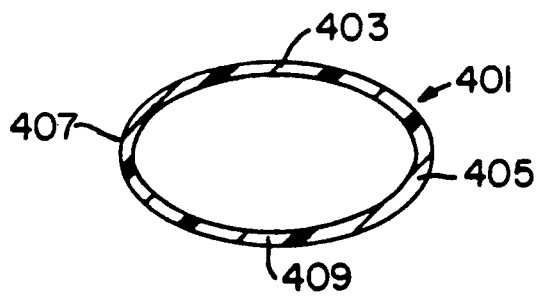
FIG. 6 shows an alternative cross member of a stanchion unit, illustrating a side cut view; and, FIG. 7 illustrates an end cut view of a base rail and mounting rail shown in FIG. 2, but includes a mounting latch and baseplate.

FIG. 6 shows an alternative configuration side cut view of a cross member 401 having a generally oval shape and having wider sides 403 and 409 and narrower sides 405 and 407. The cross member here is formed of high impact tubular plastic. The cross sections could be square, hexagon, rectangular, round, oval or of any other sound, workable geometry without exceeding the scope of the invention.

Figure 7:
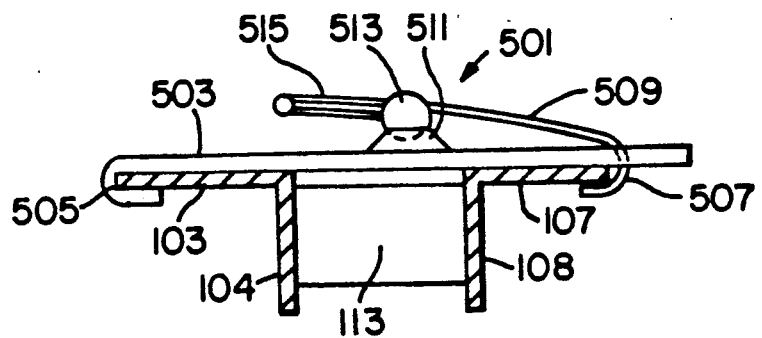

Referring back to FIG. 2 and now also to FIG. 7, there is shown in FIG. 7 a cut end view of base rail horizontal surfaces 103 and 107 with a mounting latch 501 attached thereto. Horizontal surfaces 104 and 108 are connected by spacer plate 113. As mentioned above, horizontal surfaces 103 and 107 together form a mounting platform. Base plate 503 includes a hooked end 505. Permanently attached thereto is an over-the center latch 515, also called an over-the-center clamp, with axle 513, attachment frame 511 and attachment strap 509, with hook 507 passing through an orifice in base plate 503 and attached to horizontal surface 107. Not shown on base plate 503 would be any item desired to be transported and these could be temporarily or permanently attached to base plate 503. These could include but would not be limited to tool boxes, storage bins, holders for equipment, motors, generators, pumps, power tools, display advertising boards or any other item. Additionally, the latch 501 could itself be incased within a lockable tool box or other lockable container or even be itself lockable. The rails may be joined with a single, horizontal spacer so as to form a continuous mid-section. The present invention device may include other features on the rails and/or the stanchion units, such as reflectors, lights, mounting hooks or fasteners, etc.

Obviously, numerous modifications and variations of the present invention are possible in light of the above teachings. It is therefore understood that within the scope of the appended claims, the invention may be practiced otherwise than as specifically described herein.

What is claimed is:

1. A utility rack for a pick-up truck cargo bed having two parallel walls and one forward wall, which comprises:

(a) two parallel, horizontal base rails having one running horizontal surface and one running vertical surface, the horizontal surface of one such base rail adapted to nest atop a first cargo bed parallel wall, the vertical surface of the same base rail adapted to fit against an inside surface of the first cargo bed parallel wall, and, the horizontal surface of the other such base rail adapted to nest atop a second cargo bed parallel wall, the vertical surface of the same base rail adapted to fit against an inside surface of the second cargo bed parallel wall, said two base rails being unconnected to each other except by stanchions and having no base rail along a cargo bed forward wall;

(b) two vertical stanchion units generally of an inverted "U" shape, each of said stanchion units having a pair of vertical legs extending upwardly and inwardly to a commonly connected cross member, one vertical leg of one stanchion unit being connected to one said base rail forwardly and the other vertical leg of the same stanchion unit being connected to the other said base rail forwardly, and, one vertical leg of the other stanchion unit being connected to one said base rail rearwardly and the other vertical leg of same stanchion unit being connected to the other said base rail rearwardly.

2. The utility rack of claim 1, wherein said base rails are formed of right angle pieces.

3. The utility rack of claim 1, wherein said stanchion units are formed of tubular material.

4. The utility rack of claim 3, wherein said stanchion units are tubular metal.

5. The utility rack of claim 3, wherein said stanchion units are formed of tubular plastic.

6. The utility rack of claim 1, wherein said stanchion units include at least two lateral support blocks atop each of said commonly connected cross members.

7. The utility rack of claim 2, wherein said stanchion units include at least two lateral support blocks atop each of said commonly connected cross members.

8. The utility rack of claim 1, wherein said stanchion units are permanently attached to said base rails.

9. A utility rack for a pick-up truck cargo bed having two parallel walls and one forward wall, which comprises:

(a) two parallel, horizontal base rails having one running horizontal surface one running vertical surface, the horizontal surface of one such base rail adapted to nest atop a first cargo bed parallel wall, the vertical surface of the same base rail adapted to fit against an inside surface of the first cargo bed parallel wall, and, the horizontal surface of the other such base rail adapted to nest atop a second cargo bed parallel wall, the vertical surface of the same base rail adapted to fit against an inside surface of the second cargo bed parallel wall, said two base rails being unconnected to each other except by stanchions and having no base rail along a cargo bed forward wall;

(b) two vertical stanchion units generally of an inverted "U" shape, each of said stanchion units having a pair of vertical legs extending upwardly and inwardly to a commonly connected cross member, one vertical leg of one stanchion unit being connected to one said base rail forwardly and the other vertical leg of the same stanchion unit being connected to the other said base rail forwardly, and, one vertical leg of the other stanchion unit being connected to one said base rail rearwardly and the other vertical leg of same stanchion unit being connected to the other said base rail rearwardly; and (c) two horizontal mounting rails, each having a cross section which includes a horizontal surface and a vertical surface, each of said mounting rails being connected to a base rail with its horizontal surface extending away from said base rail to which it is connected, and being connected by a plurality of commonly connected spacers, so as to create two parallel horizontal mounting surfaces adjacent to but spaced away from one another to form a platform for mounting of items to be transported.

10. The utility rack of claim 9, wherein at least one spacer connects said mounting rails and base rails at an area adjacent to each of the vertical legs of the stanchion units and said spacer extends upwardly and is further connected to at least a portion of said vertical leg to create additional structural support.

11. The utility rack of claim 9, wherein said stanchion units are formed of right angle pieces.

12. The utility rack of claim 9, wherein said stanchion units are formed of tubular material.

13. The utility rack of claim 9, wherein said stanchion units are tubular metal.

14. The utility rack of claim 9, wherein said stanchion units are formed of tubular plastic.

15. The utility rack of claim 9, wherein said two horizontal mounting rails are of equal length to said base rails.

16. The utility rack of claim 9, wherein said two horizontal mounting rails have cross sections which are mirror images of the base rails to which they are attached.

* * * * *